(No Model.)

C. M. BRONSON.
PRESSURE GAGE REGISTER.

No. 512,799. Patented Jan. 16, 1894.

Witnesses:
E. E. Masson
A. B. Diggs

Inventor:
Charles M. Bronson
By L. B. Smith, atty.

THE NATIONAL LITHOGRAPHING COMPANY,
WASHINGTON, D. C.

UNITED STATES PATENT OFFICE.

CHARLES M. BRONSON, OF QUINCY, ILLINOIS.

PRESSURE-GAGE REGISTER.

SPECIFICATION forming part of Letters Patent No. 512,799, dated January 16, 1894.

Application filed July 24, 1893. Serial No. 481,374. (No model.)

*To all whom it may concern:*

Be it known that I, CHARLES M. BRONSON, a citizen of the United States, residing at Quincy, in the county of Adams, State of Illinois, have invented certain new and useful Improvements in Pressure-Gage Registers, of which the following is a specification, reference being had therein to the accompanying drawings.

This invention relates to steam gages, in which excess of steam pressure over the desired or prescribed pressure is registered automatically; and it has for its principal object the simplifying of the recording mechanism or mechanism by which the movement of the Bourdon tube is transmitted to the recording index. This object is attained by the construction illustrated in the accompanying drawings in which—

Figure 1:
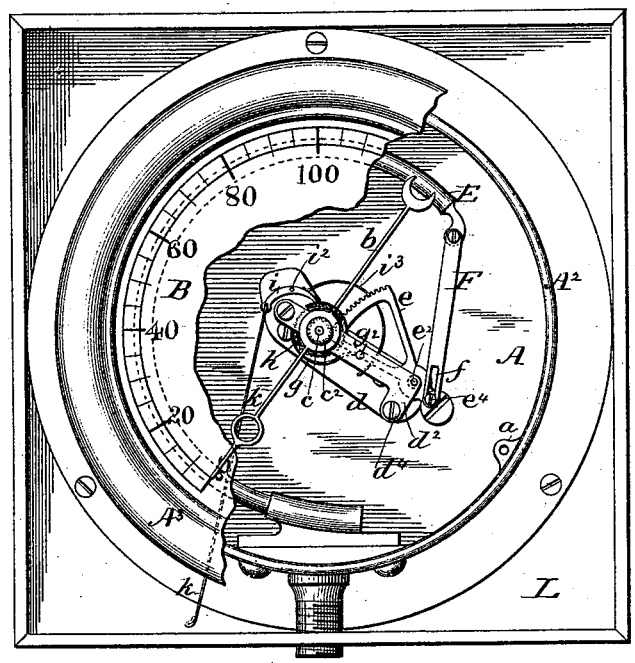
Figure 2:
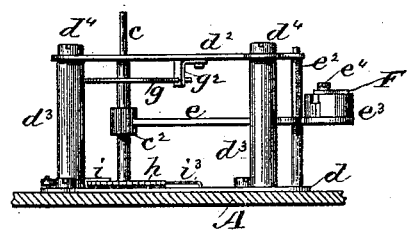

Figure 1 is a top view of the recording gage constructed in accordance with my invention, but in said view the cover of the inclosing box is shown removed and also a portion of the index scale and of the cap of the gage. Fig. 2 is a transverse section through the rear plate of the gage on which the supports of the recording mechanism are represented in side elevation.

In said drawings A represents a cylindrical case having projecting from its inner surface a series of lugs $a$ upon which is placed and secured the dial plate B with its top a short distance below the edge $A^2$ of the case to permit the index $b$ to rotate freely above it under a pane of glass (not shown) placed as usual upon said edge $A^2$ where it is retained by an annular cap $A^3$ made to screw on or clamp the cylindrical portion of the case. The pressure indicating index $b$ is secured upon the end of a shaft $c$ in the center of the case, and is arranged to play over the face of the dial plate B. Said shaft $c$ is adapted to revolve in suitable bearings in the bottom plate $d$ and bridge plate $d^2$ of the shaft retaining frame. The plate $d^2$ is retained connected to the plate $d$ at a suitable distance apart by means of posts $d^3$ and screws $d^4$ on the ends thereof. The shaft $c$ carries a pinion $c^2$ which engages with a sector $e$ fixed to a shaft $e^2$, mounted in bearings in the plates $d$ $d^2$ in which it can revolve.

The sector $e$ has on its outer end a counterbalancing weight $e^3$ and said end is connected with the free end of the Bourdon tube E by means of a sheet metal link F having one end pivoted to said free end of the tube E. The opposite end of the link F has a slot $f$ lengthwise thereof that extends nearly to said end of the link and receives loosely therein a screw $e^4$ secured in the counterbalancing end of the sector.

The above described construction of the device is substantially the same as that used in Bourdon steam gages; but my device is intended to be used mainly as a recording gage in connection with another pressure indicating gage of any suitable construction, but substantially independently and at a distance from the latter. The recording, setting, and releasing mechanism is organized and arranged as follows: Upon the shaft $c$ a short distance below the bridge plate $d^2$, is secured one end of a coiled hair-spring $g$ that has its outer end secured to the bridge plate at $g^2$. Upon the same shaft $c$, adjacent to the bottom bearing plate $d$, a ratchet wheel $h$ is secured that has in engagement with its teeth a pawl $i$. Said pawl is pivoted at $i^2$ to the plate $d$ and has its acute end normally retained in engagement with the ratchet wheel $h$ by means of a spring $i^3$ having one end pressing upon said acute end, and the other secured to the plate $d$, so as to normally prevent a back rotation of the ratchet wheel, and thus lock the index $b$ and cause it to register the highest pressure of steam to which the Bourdon tube may have been subjected since the device had been set or its index returned to zero, or to the number of pounds of prescribed pressure at which the steam in a boiler should be carried. The slot $f$ in the link F is to permit the sector $e$, the pinion $c^2$, the ratchet wheel $h$ and its pawl $i$ to be relieved of strain after a high pressure has been reached and recorded, and the pressure in the boiler has been returned to normal, or even entirely removed.

To set the device as above stated by authorized persons, and no others, there is attached to the heel or blunt end of the pawl $i$ a light rod $k$ that passes loosely through the wall of the case A and permits the authorized person to pull on said rod and release the pawl from engagement with the ratchet wheel after he has taken note of the high steam pressure indicated by the index since its previous examination.

To prevent tampering with the device by a careless or negligent fireman, the gage and its setting rod $k$ are inclosed in a box L that is to be kept closed by a cover properly secured by a lock, a seal, or other suitable well known means to prevent ready access to the contents of the box.

Having now fully described my invention, I claim—

1. In a pressure registering steam gage, the combination of the gage case, a Bourdon tube having a slotted link at one end, a pivoted sector connected with said link, a pinion and its shaft, a hair spring and a ratchet wheel mounted upon said shaft, a pivoted pawl having one end in engagement with said ratchet wheel, a rod attached to the opposite end of the pawl and passing through the wall of the gage-case and a box inclosing the gage substantially as described.

2. In a pressure registering steam gage, the combination of the gage case, a Bourdon tube having at one end a slotted link, a pivoted sector connected with said link, a pinion and its shaft, a coiled spring and a ratchet wheel mounted upon said shaft, a pivoted pawl having one end in engagement with said ratchet wheel and a rod attached to the opposite end of the pawl and passing through the wall of the steam gage substantially as described.

CHARLES M. BRONSON.

Witnesses:
S. T. MESSICK,
S. T. MESSICK, Jr.